United States Patent [19]

Partington

[11] 4,213,242

[45] Jul. 22, 1980

[54] ATTACHMENT FOR SABER SAW

[76] Inventor: Everett J. Partington, 620 S. Elizabeth, Oconomowoc, Wis. 53066

[21] Appl. No.: 5,555

[22] Filed: Jan. 22, 1979

[51] Int. Cl.² .................. B27B 11/02; B27B 19/09
[52] U.S. Cl. .................................. 30/374; 30/392
[58] Field of Search ............... 30/371, 374, 375, 376, 30/392, 393

[56] References Cited

U.S. PATENT DOCUMENTS

| | | | |
|---|---|---|---|
| 2,122,611 | 7/1938 | Kirby | 30/376 |
| 2,619,721 | 12/1952 | King | 30/392 X |
| 2,996,089 | 8/1961 | McCarty | 30/374 |
| 3,303,861 | 2/1967 | Kane | 30/374 |

FOREIGN PATENT DOCUMENTS 90 of 1914 United Kingdom ............ 30/392

*Primary Examiner*—Jimmy C. Peters
*Attorney, Agent, or Firm*—Andrus, Sceales, Starke & Sawall

[57] ABSTRACT

An attachment for use with a saber saw which enables the saber saw to make straight non-wandering cuts. The attachment includes a plate which is secured flatwise to the base of the saber saw and a supporting fin extends downwardly from the plate and is located behind the reciprocating blade of the saber saw. The lower portion of the fin has a pair of spaced guides which define a slot to receive the blade. The fin and guide members maintain the blade in perpendicular relation to the base plate and prevent deformation of the blade as a cut is made.

11 Claims, 6 Drawing Figures

U.S. Patent   Jul. 22, 1980   Sheet 2 of 2   4,213,242
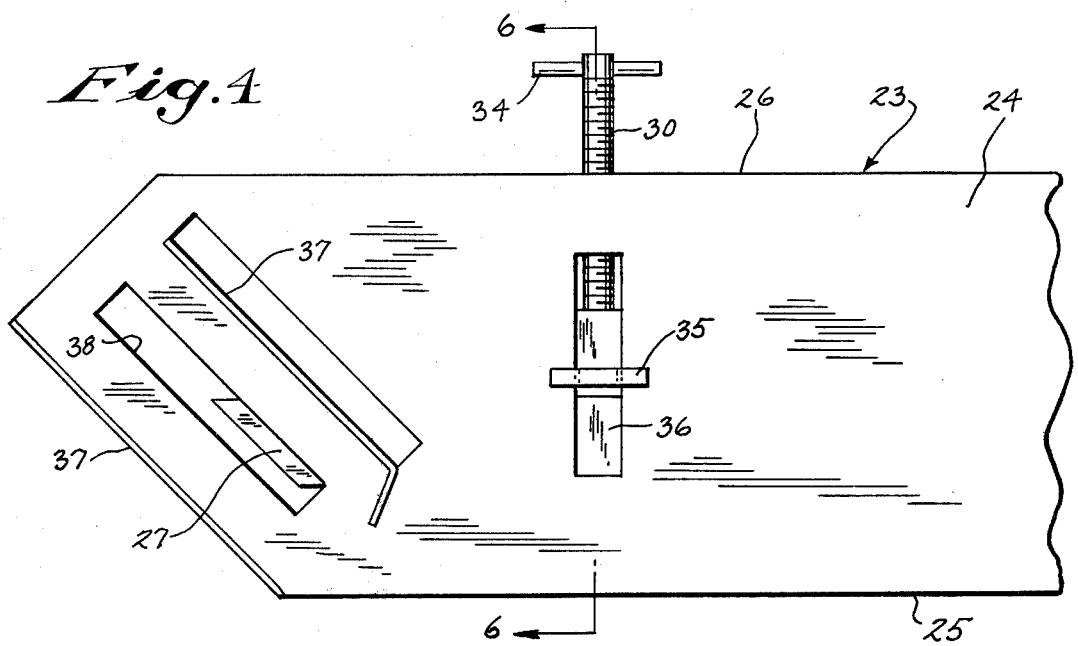
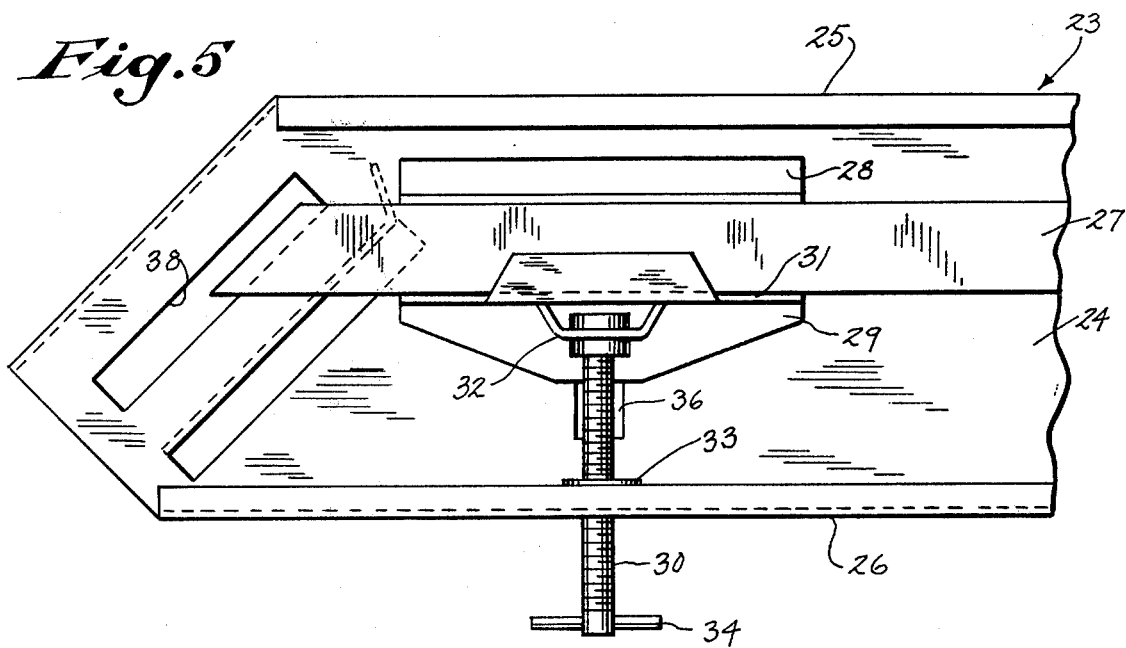
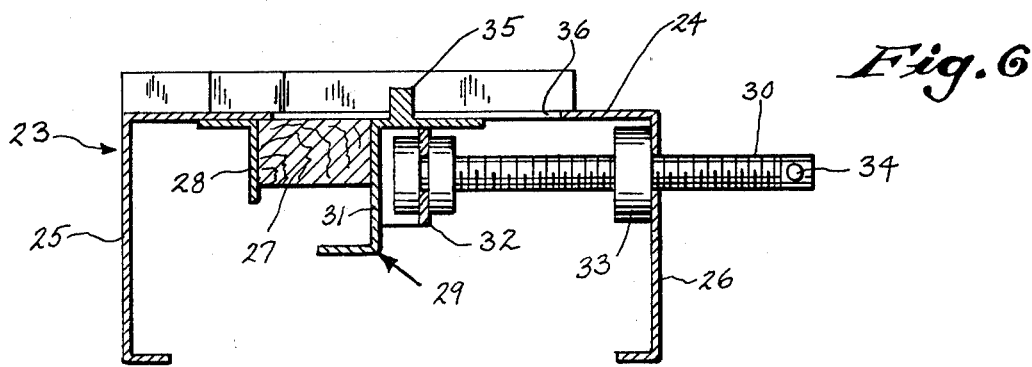

ATTACHMENT FOR SABER SAW

BACKGROUND OF THE INVENTION

The conventional electric saber saw includes a casing or body which houses the motor and a base plate is mounted on the body and is adapted to ride along the work surface as a cut is being made. A reciprocating cutting blade extends downwardly from the body through a slot or recess in the base plate and serves to cut the work surface as the saw is moved along the surface.

As the blade is relatively thin and is unsupported throughout its length, it tends to deflect or bend laterally so that the cut may not be truly vertical. In addition, the blade may also tend to bend away from a true fore-and-aft direction, causing the blade to wander and making it difficult to obtain a straight cut.

Because of this, a saber saw is used primarily for cutting holes in a work surface such as wall board or panelling, or making irregular shaped cuts. Straight cuts are usually made by use of a circular saw, but the average home owner may not be comfortable with the use of a circular saw due to the noise and the large, high speed, rotating blade. In addition, many homeowners do not have access to a circular saw, so that there is a need for an attachment which will enable the conventional saber saw to make a straight, non-wandering cut.

SUMMARY OF THE INVENTION

The invention is directed to an attachment for use with a saber saw which enables the saber saw to make a straight non-wandering cut. The attachment includes a plate which is mounted flatwise against the base of the saber saw and a supporting fin extends downwardly from the plate and is located in abutting relation to the rear edge of the blade of the saber saw. The lower end portion of the fin is provided with a pair of spaced guides which define a slot to receive the reciprocating blade.

The fin and guide members maintain the blade in a perpendicular relation to the base of the saber saw and prevent the blade from deflecting or bending in a lateral direction, as well as preventing the blade from deflecting away from the line of cut. Thus, the saw with the attachment is capable of making a straight, non-wandering cut.

For making angular cuts, as when installing window trim, or making picture frames, the saber saw with the guide attachment can be used with a special miter box. The work piece to be cut is clamped to the undersurface of the miter box, and the upper surface of the miter box has parallel guides which are positioned at the desired angle to the workpiece and a slot is located between the guides and receives the saber saw blade. The guides serve as a track to guide the saber saw in movement as the workpiece is cut.

The attachment maintains the reciprocating saber saw blade in a perpendicular condition with respect to the base of the saw and prevents the blade from wandering. The fin and the attached guide members also provide added support for the blade to prevent breakage of the blade.

The plate or bracket of the attachment can be readily attached to all common types of saber saws without the use of additional connections or fasteners. An automatic locking mechanism is utilized in which the bracket is provided with an offset tongue that fits into an opening in the base of the saw to provide a tight locking engagement with the base of the saw.

DESCRIPTION OF THE DRAWINGS

The drawings illustrate the best mode presently contemplated of carrying out the invention.

In the drawings:

FIG. 4 is a plan view of a miter box with which the saber saw and attachment can be utilized to make 45° angle cuts;

FIG. 5 is a bottom view of the miter box as shown in FIG. 4; and

FIG. 6 is a section taken along line 6—6 of FIG. 4.

DESCRIPTION OF THE PREFERRED EMBODIMENT

Figure 1:
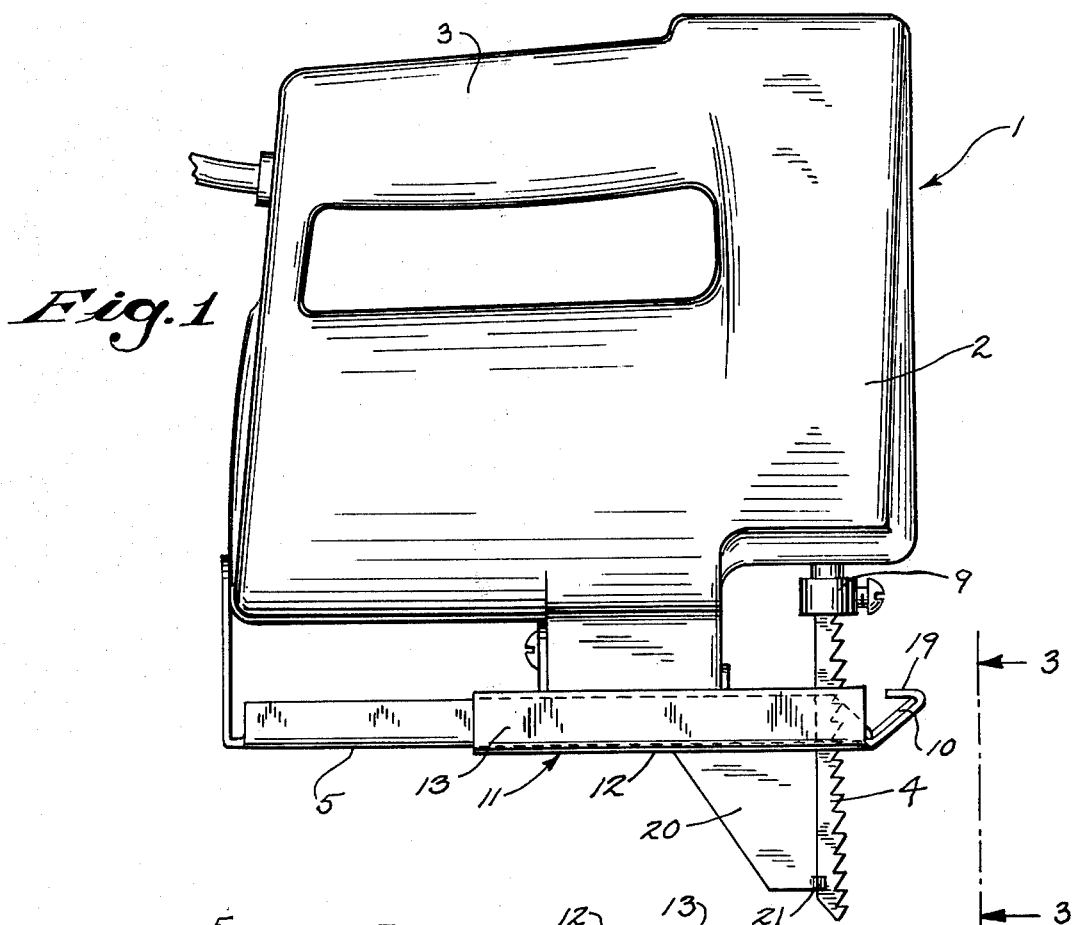
FIG. 1 is a side elevation of the conventional saber saw having the attachment of the invention secured to the base plate.
Figure 2:
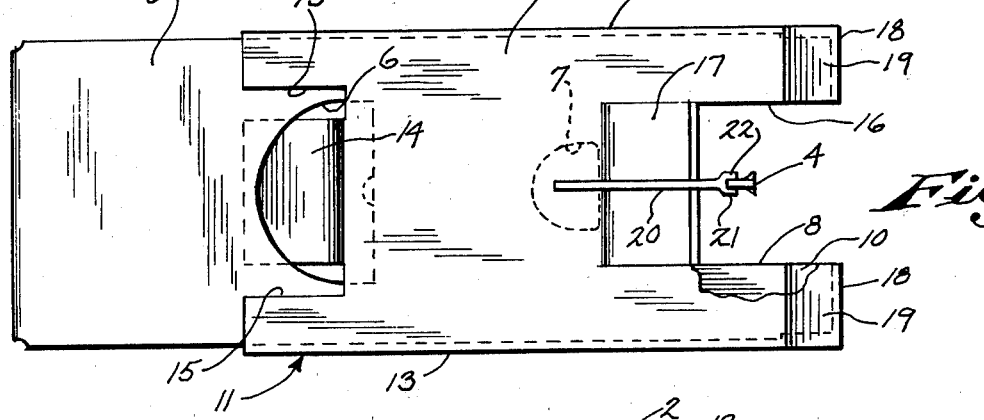
FIG. 2 is a bottom view of the attachment as attached to the saber saw with parts broken away.
Figure 3:
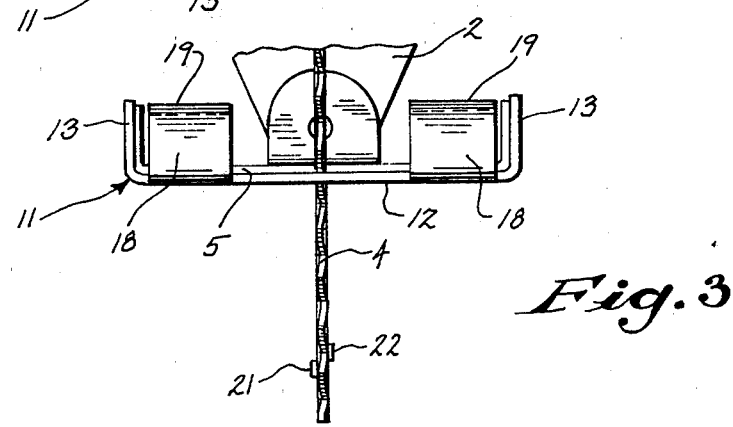
FIG. 3 is a section taken along line 3—3 of FIG. 2.

FIGS. 1-3 illustrate a conventional saber saw 1 including a casing or body 2 having a handle 3. The motor or other drive mechanism is housed within the casing 2 and serves to drive the blade 4 in a reciprocating movement.

A flat base 5 is secured to the lower portion of the casing 2 and is provided with a pair of punched-out openings 6 and 7. The forward portion of the base 5 is provided with a recess or slot 8 which receives the blade which is removably connected to the casing 2 through use of the head 9. As shown in FIG. 1, the forward ends of the base plate 5, bordering the recess 8 are provided with upturned tips 10.

In accordance with the invention, an attachment 11 is adapted to be removably connected to the base plate 5 and includes a generally flat central section 12 and a pair of parallel spaced, side flanges 13. The rear portion of the central section 12, is formed with an upwardly offset tongue 14 which is defined by a pair of parallel slots 15 located in the rear edge of the central section 12.

The attachment 11 is adapted to be slid onto the base plate 5 with the side edges of the base plate being located inwardly of the side flanges 13 on the attachment. As the attachment is slid toward the rear, the tongue 14 is received within the larger opening 6 in the base plate 5 to limit further rearward movement of the attachment 11 with respect to the base plate.

As best shown in FIG. 2, the forward end of the attachment 11 is provided with a slot or recess 16 which is aligned with the slot 8 in the base plate and receives the cutting blade. The area directly to the rear of the slot 16, as shown by 17, is recessed upwardly.

The forward edge of the attachment 11 is provided with a pair of diagonally extending feet 18 which receive the upturned tips 10 of the base plate, and the upper end of each foot 18 is formed with a rearwardly extending flange 19.

The engagement of tongue 14 with opening 6 in the base plate and the engagement of tips 10 with feet 18 holds the attachment in tight flatwise relation to the base plate 5.

Extending downwardly from the central section 12 of the attachment is supporting fin 20 which is located directly behind the cutting blade 4, as best shown in FIG. 1. Mounted on the lower end of the fin 20 are tabs 21 and 22 which in combination define a slot to receive the lower end of the cutting blade 4. With this construction, the fin 20 supports the blade and prevents the blade from deflecting rearwardly as the saw is moved through the workpiece in making the cut. Tabs 21 and 22 prevent the blade from deflecting laterally or twisting relative to the line of cut, thereby insuring that the blade will make a straight non-wandering cut as it moves through the workpiece.

The saber saw 1 with the attachment 11 can be used in combination with a miter box 23, as illustrated in FIGS. 4–6, to make angular cuts as for example, when cutting door or window trim, or making picture frames. The miter box 23 includes a generally flat base plate 24 having front and rear flanges 25 and 26. The workpiece 27 to be cut is clamped between an angle shaped fixed clamp 28 and a movable clamp 29, both of which are located on the undersurface of the base plate 24. As best illustrated in FIG. 6, a threaded rod 30 is attached to the central vertical section 31 of the movable clamp 29 through bracket 32 and the central portion of rod 30 is threaded within a nut 33 attached to the front flange 25. The outer end of the threaded rod 30 carried an operating handle 34, and by rotating the handle, the rod and movable clamp 29 will be moved toward and away from the fixed clamp 28 to thereby clamp and release the workpiece 27.

To guide the movable clamp 29 in movement, a guide tab 35 extends upwardly from the movable clamp through a slot 36 in the base plate 24 and the engagement of the tab 35 with the slot 36 insures that the movable clamp will be moved in a direction perpendicular to the fixed clamp 28.

The workpiece is clamped to the undersurface of the base plate 24, and the saber saw with the attachment 11 is adapted to be moved within parallel guides 37 along the upper surface of te base plate to make the angular cut on the workpiece. As best shown in FIG. 4, a slot 38 is formed between the guides 37 and the blade 4 of the saber saw and is adapted to project through the slot and is brought into contact with the workpiece as the saw is moved between the guides 37.

Using the miter box 23, the saber saw, with the attachment 11, can be utilized to make 45° angle cuts for door trim, window trim, and the like, as well as making picture frames. As the blade is held securely by the fin 20 and guide tabs 21 and 22, a straight, non-wandering cut can be made.

The attachment can be readily connected to all common types of saber saws without the use of auxiliary fasteners or connectors, and an automatic lock is provided in which the tongue on the attachment will fit into the hole in the base of the saw to accurately position the attachment relative to the saw.

Various modes of carrying out the invention are contemplated as being within the scope of the following claims particularly pointing out and distinctly claiming the subject matter which is regarded as the invention.

I claim:

1. an attachment to be used with a saber saw, said saber saw having a casing and a generally flat base secured to the casing and having a reciprocating blade extending through a slot in said base, said attachment comprising a plate to be attached to the base and having a slot aligned with the slot in the base to receive the blade, a fin extending downwardly from the outer surface of the plate and disposed in fore-to-aft alignment with the slot, said fin adapted to be disposed in edgewise abutting relation with the rear edge of the blade to support the blade as a cut is made, and guide means on the forward edge of the fin and defining a vertical slot adapted to receive the lower portion of the blade to prevent deflection of the blade in a lateral direction.

2. The attachment of claim 1, and including a tongue disposed along the rear edge of the plate and adapted to be received within an opening in the base of the saber saw when the plate is attached to said base.

3. The attachment of claim 2, wherein said tongue is offset from the plane of said plate and lies in a plane parallel to the plane of said plate.

4. The attachment of claim 1, wherein said plate includes a pair of projecting feet located on either side of the slot in said plate, the forward ends of said feet being provided with upwardly extending tips to receive the forward portion of the base on the saber saw.

5. The attachment of claim 4, wherein said tips are provided with rearwardly extending terminal flanges.

6. An attachment for a saber saw to enable the saber saw to make straight non-wandering cuts, said saber saw having a generally flat base and having a reciprocating blade extending downwardly through a recess in said base, said attachment comprising a plate to be attached flatwise to the base and having a slot aligned with the recess in the base and adapted to receive said blade, a pair of upstanding side flanges on said plate and adapted to be disposed outwardly of the side edges of the base, a tongue located at the rear edge of the plate and defined by a pair of generally parallel slots, said tongue being offset upwardly from the plane of said plate and adapted to be received within an opening in the base as the plate is slid onto the base, a fin extending downwardly from the lower surface of the plate and disposed in fore-to-aft alignment with the slot in said plate, said fin having a forward edge adapted to be disposed in abutting supporting relation with the rear edge of said cutting blade, and a pair of guide members disposed on the lower portion of the fin and defining a vertical slot to receive the lower portion of the blade and prevent lateral deflection of the blade to enable the blade to make a straight non-wandering cut.

7. In combination, a saber saw including a casing and a base attached to the casing, the forward end of said base being provided with an open ended recess, a reciprocating blade secured to the casing and extending downwardly through said recess, and an attachment removably secured to the base, said attachment including a plate secured flatwise to the lower surface of the base and having a slot aligned with the recess in the base to receive the blade, a fin extending downwardly from the lower surface of the plate and disposed in fore-to-aft alignment with said slot, the forward vertical edge of said fin disposed in abutting relation with the rear edge of the blade, and guide means on the forward edge of the fin and defining a vertical slot to receive the lower portion of the blade and prevent lateral deflection of the blade.

8. The combination of claim 7, wherein said base is provided with an opening and the plate has a tongue located at the rear end of the plate, said tongue being defined by a pair of spaced parallel slots and said tongue being offset upwardly from the plate and disposed within the opening in said base.

9. The combination of claim 7, wherein said base is provided with a pair of upwardly extending forward tips located on either side of said recess and said plate is provided with a pair of pockets on either side of the slot to receive the tips on said base.

10. A miter box construction to be used with a saber saw to make an angular cut on a workpiece, comprising a base, clamping means for clamping the workpiece on one surface of the base, and guide means disposed on the opposite surface of the base for guiding a saber saw in movement in a direction at an angle to the workpiece, said base having a slot disposed parallel to said guide means to receive the reciprocating blade of the saber saw.

11. The miter box of claim 10, wherein said clamping means comprises a fixed clamp and a movable clamp, said clamps being disposed at an acute angle with respect to said guide means.

* * * * *

UNITED STATES PATENT AND TRADEMARK OFFICE
CERTIFICATE OF CORRECTION

PATENT NO. : 4,213,242

DATED : July 22, 1980

INVENTOR(S) : EVERETT J. PARTINGTON

It is certified that error appears in the above-identified patent and that said Letters Patent are hereby corrected as shown below:

Column 3, line 24, Cancel "carried" and substitute therefor ---carries---, Column 3, line 38, Cancel "te" and substitute therefor ---the---, Column 3, line 61, CLAIM 1, After "1." cancel "an" and substitute therefor ---An---, Column 5 and 6, CLAIMS 10 and 11, Cancel these claims in their entirety.

Signed and Sealed this

Twenty-first Day of October 1980

[SEAL]

Attest:

SIDNEY A. DIAMOND

Attesting Officer

Commissioner of Patents and Trademarks